United States Patent [19]

Nakai et al.

[11] Patent Number: 4,801,191

[45] Date of Patent: Jan. 31, 1989

[54] CONNECTING SECTION FOR OPTICAL FIBER CABLE

[75] Inventors: Sinichiro Nakai; Yuichi Obara; Renichi Yuguchi; Shigeru Tachigami, all of Ichihara, Japan

[73] Assignee: The Furukawa Electric Co., Ltd., Tokyo, Japan

[21] Appl. No.: 894,031

[22] Filed: Aug. 7, 1986

[30] Foreign Application Priority Data

Sep. 25, 1985 [JP] Japan ................. 60-210030

[51] Int. Cl.[4] .............................. G02B 6/36
[52] U.S. Cl. ...................... 350/96.20; 350/96.22
[58] Field of Search ............... 350/96.20, 96.21, 96.22, 350/96.23

[56] References Cited

U.S. PATENT DOCUMENTS

| 4,140,367 | 2/1979 | Makuch et al. | 350/96.22 |
| 4,279,469 | 7/1981 | Forman | 350/96.22 |
| 4,312,563 | 1/1982 | Mead | 350/96.2 |
| 4,422,716 | 12/1983 | Morimoto et al. | 350/96.21 |
| 4,595,256 | 6/1986 | Guazzo | 350/96.22 X |

OTHER PUBLICATIONS

*Preliminary Data Sheet,* "Fiber Optic Connectors", Cablewave Systems Inc., 60 Dodge Ave., North Haven, Conn. 06473, Mar. 1978, No. 57B, 2pp.

*Primary Examiner*—John D. Lee
*Attorney, Agent, or Firm*—Foley & Lardner, Schwartz, Jeffery, Schwaab, Mack, Blumenthal & Evans

[57] ABSTRACT

A connecting section for optical fiber cables which has multicore connectors respectively mounted simultaneously on a plurality of optical fiber core wires led from the end of the cable sheath of one optical fiber cable and on a plurality of optical fiber core wires led from the end of the cable sheath of the other optical fiber cable, housings respectively projected toward the ends of the cable sheaths and mounted on the outer peripheral surfaces of the ends of the cable sheaths for containing the optical fiber core wires with the multicore connectors and a spring for applying a force for butting the optical fiber core wires to the multicore connectors to hold the connectors in the ends of the housings so that the connecting ends of the multicore connectors are opposed in such a manner that the optical fiber core wires are simultaneously optically connected and that the housings are connected through an adapter formed over the outer peripheral surfaces of the ends thereof and fittings for securing the outer peripheral surfaces of the ends thereof.

Thus, the connecting section can efficiently conduct the connecting works and reduce in size thereof.

14 Claims, 4 Drawing Sheets

CONNECTING SECTION FOR OPTICAL FIBER CABLE

BACKGROUND OF THE INVENTION

This invention relates to an improvement in a connecting section for optical fiber cables used in a communication field.

In case of connecting optical fiber cables, it is general to fusion-bond the core wires 4 of the cables led from the ends of the cable sheaths and to cover the connection section by a connecting box. More particularly, the connecting section 2 of the optical fiber cables 1 is composed in the sequence described with reference to FIG. 11.

In a conventional example shown in FIG. 11, cable sheaths 3 are first removed in a suitable length, the core wires 4 of the optical fiber cables are drawn from the ends of the sheaths 3, excessive extensions 4A of the wires 4 are formed, and fusion-bonded to form a fusion-bonded connecting portion 5. Then, the cables 1 are connected through a tension member 6 secured over the cable sheaths, and the entirety is then covered by a connecting box 7.

In the conventional example described above, the fusion-bonded connecting section of the core wires 4 is a main body.

In this fusion-bonded connecting section has high reliability after the connection, but a high skilfulness is required for the connecting work, and since the connecting work is conducted at the site under the wrong conditions, a connecting mistake might frequently occur. In addition, a number of pairs of optical fiber core wires are connected at every pair, and the working efficiency decreases, and the connecting work cannot be completed in a short time.

On the other hand, when the connecting section is discussed in the construction, since the excessive extensions of the optical fiber core wires must be provided by considering the connecting modification of the core wires, the connecting section increases in diameter due to the excessive extensions.

SUMMARY OF THE INVENTION

Accordingly, an object of this invention is to provide a connecting section for optical fiber cables capable of eliminating the abovementioned drawbacks and efficiently conducting the connecting works and reducing in size thereof.

In order to achieve the above and other objects, there is provided a connecting section for optical fiber cables which comprises multicore connectors respectively mounted simultaneously on a plurality of optical fiber core wires led from the end of the cable sheath of one optical fiber cable and on a plurality of optical fiber core wires led from the end of the cable sheath of the other optical fiber cable, housings respectively projected toward the ends of the cable sheaths and mounted on the outer peripheral surfaces of the ends of the cable sheaths for containing the optical fiber core wires with the multicore connectors and a spring for applying a force for butting the optical fiber core wires to the multicore connectors to hold the connectors in the ends of the housings so that the connecting ends of the multicore connectors are opposed in such a manner that the optical fiber core wires are simultaneously optically connected and that the housings are connected through an adapter formed over the outer peripheral surfaces of the ends thereof and fittings for securing the outer peripheral surfaces of the ends thereof.

In the connecting section of such optical fiber cables according to this invention as described above, the optical fiber core wires are simultaneously connected through the multicore connectors, and the housings mounted at the ends of the cable sheaths are connected through the adapter and the fittings.

The connecting work of these connecting parts is not particularly difficult, can be simply and rapidly executed on a site, and the reproducibility of connecting the cables is also provided.

When the cables of the reproducibility are connected, it is not necessary to provide excessive extensions of the optical fiber core wires, and the diameter of the connecting section of the optical fiber cable can be reduced that much in the omission of the excessive extensions of the core wires.

The multicore connectors and the housings described above can be mounted in advance at the optical fiber cables in a factory, and the optical fiber cable having the multicore connectors and the housings can be manufactured in a mass production.

Therefore, the share of the work in the site can be reduced, and yet the connecting section of the optical fiber cable can be rationally provided.

The above and other related objects and features of the invention will be apparent from a reading of the following description of the disclosure round in the accompanying drawings and the novelty thereof pointed out in the appended claims.

DESCRIPTION OF THE PREFERRED EMBODIMENTS

A first embodiment of a connecting section for optical fiber cables according to this invention will now be described in detail with reference to FIGS. 1 to 3.

Figure 1:
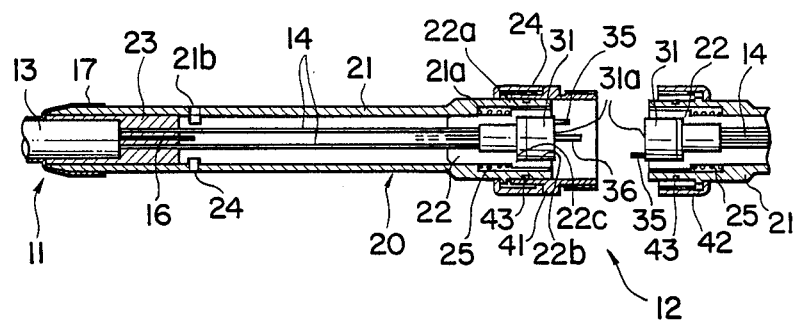
FIG. 1 is a longitudinal sectional view of a first embodiment of a connecting section for optical fiber cables according to this invention showing the state before connecting the optical fiber cable.
Figure 2:
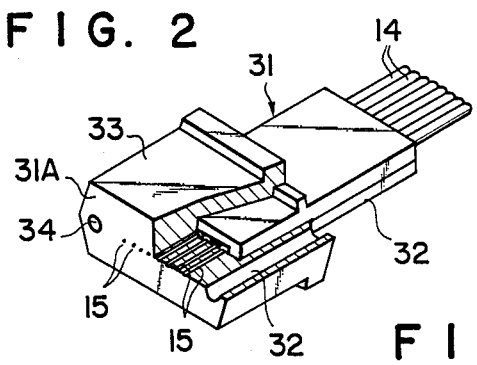
FIG. 2 is a perspective fragmentary view of a multicore connector used in the embodiment.
Figure 3:
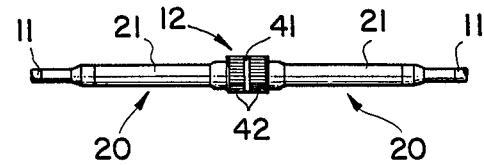
FIG. 3 is a side view of the completed state of the connecting section.
Figure 4:
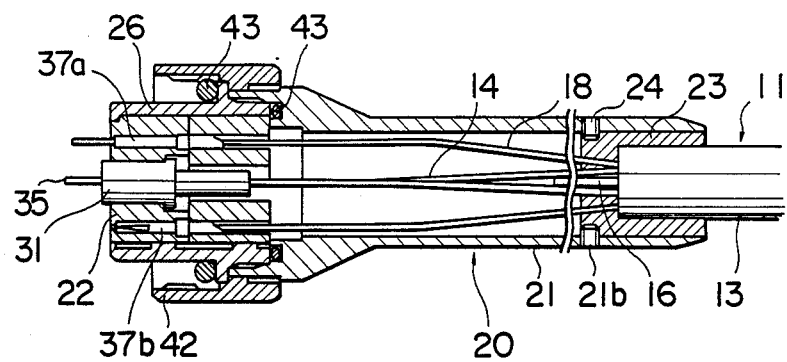
FIGS. 4 and 5 are longitudinal and lateral sectional views of second embodiment of a connecting section for optical fiber cables according to this invention.
Figure 5:
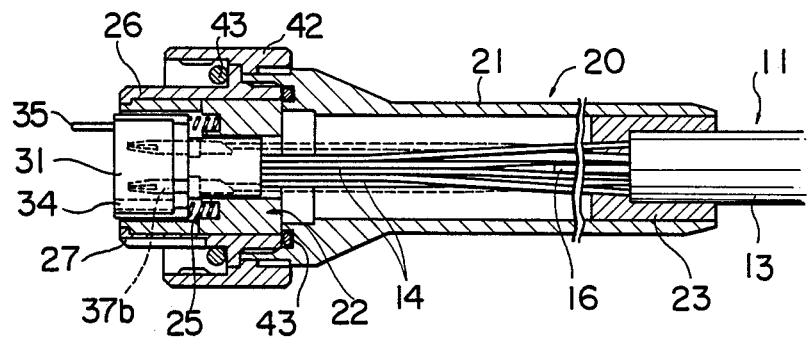
Figure 6:
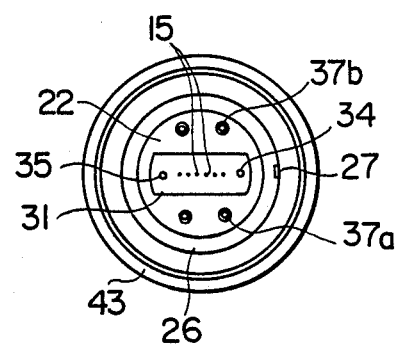
FIG. 6 is a front view of the end of the optical fiber cable in the second embodiment.
Figure 7:
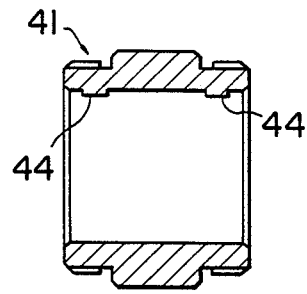
FIG. 7 is a sectional view of an adapter in the second embodiment.

As shown in the first embodiment of the connecting section for the optical fiber cables in FIGS. 1 to 3, reference numeral 11 designates optical fiber cables, numeral 12 connecting sections of the optical fiber cables, numeral 13 cable sheaths, numeral 14 a plurality of optical fiber core wires (secondary coating optical fiber), numeral 15 bare optical fiber, and numeral 16 a tension member.

As apparent by referring to FIGS. 1 and 3, two optical fiber cables 11 of a connecting pair are opposed at the ends thereof, and a plurality of optical fiber core wires 14 are led from the ends of the cable sheaths 13.

Housings 20 are respectively mounted on the outer peripheral surfaces of the ends of the sheaths 13, and each formed of a long cylindrical outside housing member 21 and a short cylindrical or cap-shaped inside housing member 22.

The outside housing member 21 has an opening 21b on the peripheral surface of the base end side.

The base end of the member 21 is relatively engaged with the end of the cable sheath 13, secured through fixing resin 23 filled in the member 21 from the opening 21b, and the opening 21b is, after fixing, blocked through a screw 24.

The tension member 16 drawn from the end of the sheath 13 is fixed by the resin 23 into the member 21.

A thermally shrinkable tube 17 is coated over the base end of the member 21 and the sheath 13 to densely coat the base end by the shrinking force thereof.

The housing member 21 thus mounted on the outer peripheral surface of the end of the sheath 13 extends from the end of the sheath, and the member 22 is engaged longitudinally movably within the end of the member 21.

A stepped portion 21a is formed at the boundary between the large-diameter portion of the front end side and the small-diameter portion of the rear end side of the inner peripheral surface of the member 21 with relatively different inner diameter.

A stepped portion 22a is formed at the boundary between the large-diameter portion of the front end side and the small-diameter portion of the rear end side of the outer peripheral surface of the member 22 with relatively different outer diameter.

The relative relationship between the members 21 and 22 resides in the arrangement that the member 22 is disposed longitudinally movably in the member 21, a compression spring 25 is interposed between the stepped portion 21a of the member 21 and the stepped portion 22a of the member 22 to thereby apply an elastic force in the direction for projecting the member 22 from the end of the member 21.

The tension of the spring 25 opposes the multiconnectors to one another as well be described in detail.

In order to limit the projecting distance of the member 22 from the member 21, a screw, not shown, is screwed from the member 21, and engaged with a long slot of the end of the member 22.

More specifically, when the screw is engaged with the end or the long slot, the projecting distance of the member 22 is limited to prevent it from removing.

In the embodiment described above, the core wires 14 led from the end of the sheath 13 are simultaneously mounted at the ends thereof with the multicore connector 31.

The multicore connector 31 is formed, as apparent by referring to FIG. 2, of a positioning grip 32 and a molding unit 33. The grip 32 grips the ends of the core wires 14 aligned in lateral parallel state of a predetermined pitch, and the unit 33 simultaneously mounts optical fibers 15 projected from the grip 32 and removed from coatings of the core wires in lateral parallel state of a predetermined pitch.

The molding unit 33 described above is, for example, provided by filling the optical fiber core wires 14 gripped by the grip 32 in a mold and pouring resin in the mold.

The molding unit 33 of another example is provided by mounting the molding unit 33 formed in advance on the ends of the core wires 14.

The ends of the optical fibers 15 are exposed at the ends of the molding unit 33, centering guide openings 34 are formed in parallel with the fibers 15 at both sides of the optical fiber array in the molding unit 33, and the end of the molding unit 33, i.e., the connecting ends 31A of the multicore connectors 31 are smoothly polished together with the ends of the optical fibers 15.

The optical fiber core wires 14 with the multicore connectors 31 are contained in the housing member 21, and the multicore connectors 31 are engaged within the inside housing member 22 in the state that the connecting ends 31A are exposed, and the optical fiber core wires 14 with the multicore connectors 31 are contained in the housing member 21.

More particularly, the multicore connectors 31 are engaged within the connector containing recess 22b of the housing member 22, and the rear end is contacted with the stepped portion of the connector containing recess 22b to prevent the connector 31 from moving backward.

The ends of the two housing members 21 are engaged therein from the both end openings of the adapter 41 to be opposed, and the connecting ends 31A of the two multicore connectors 31 are opposed in the adapter 41 to optically connect the optical fibers.

In this case, in order to preferably center the optical fibers 15, a certering guide pin 35 is inserted into the guide opening 34 of the molding units 33 to be centered as predetermined.

The two housing members 22 are also inserted with a guide pin 36 into the guide openings, not shown, to be centered.

The two housing members 21 are connected through fittings 42 made of cap nuts to the adapter 41.

Thus, threads are formed on the outer peripheral surfaces of the both ends of the adapter ends of the adapter 41, and collars are formed, as shown, on the outer peripheral surfaces of the ends of the housing member 21.

An O-ring 43 is engaged on the outer peripheral surface of the member 21 to hermetically contact the inner peripheral surface of the adapter 41.

In the embodiment described above, the housing member 22 and the multicore connector 31 may be formed integrally.

Second embodiment of this invention will now be described with reference to FIGS. 4 to 7.

In the embodiment shown in FIGS. 4 to 7, an optical fiber cable 11 is formed of a composite cable having metal core wires 18, a housing 20 is formed of a long cylindrical outside housing member 21 mounted on the outer peripheral surface of the end of a cable sheath 13, a short cylindrical extension housing member 26 coupled through a threaded strucure with the end of the member 21, and a short cylindrical or cap-shaped inside housing member 22 secured into the housing member 26, and the housing member 22 is longitudinally split into front and rear housing members.

In the embodiment described above, a multicore connector 31 and metal connectors 37a, 37b are respectively mounted on optical fiber core wires 14 led from the end of the sheath 13, and the metal core wires 18.

The connector 37a is formed in a male shape, and the connector 37b is formed in a female shape, and the connectors 37a, 37b are detachably engaged with one another.

In the embodiment described above, the multicore connector 31 is engaged within the housing member 22, a predetermined opposing force is applied through a spring 25 interposed between the connector 31 and the housing member 22 to the connector 31, and the connectors 37a, 37b are mounted in the housing member 22 to be restricted in the element.

Further, keyways 27 are formed on the outer peripheral surface of the housing member 26, and keys 44 corresponding to the keyways 27 are formed on the inner peripheral surface of the adapter 41 so that the keys 44 and the keyways 27 are engaged with each other.

The keyways 27 and the keys 44 may alternately be formed in such a manner that keys 44 are formed on the outer peripheral surface of the housing member 26 and keyways 27 are formed on the inner peripheral surface of the adapter 41.

Further, the keyways and the keys may be also formed in the relative relationship between the outside housing member 21 and the adapter 41.

In the embodiment shown in FIGS. 4 to 7, the optical fiber core wires are connected with each other, and the metal core wires are connected through predetermined connectors, and the connecting wire is held through the adapter 41 and the fittings 42.

A third embodiment of the invention will be described with reference to FIG. 8.

Figure 8:
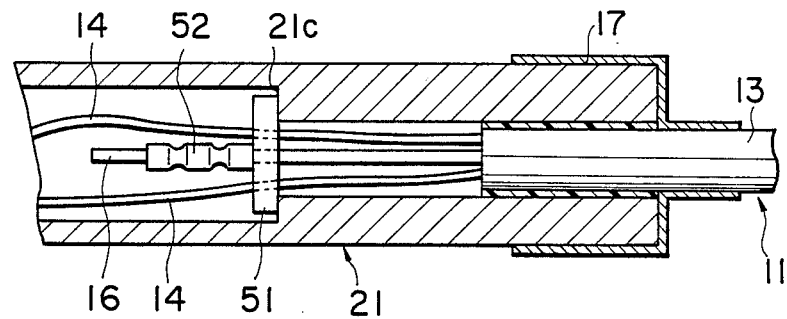
FIG. 8 is a sectional view of the interior structure of an outside housing member in a third embodiment of a connecting section for optical fiber cables according to this invention.

In the embodiment of the optical fiber cable 11 in FIG. 8, optical fiber core wires and a tension member 16 are led from the end of a cable sheath 13, and an outside housing member 21 having a stepped portion 21C on the inner peripheral surface of a base end side is mounted similarly to the above on the outer peripheral surface of the end of the sheath.

In the embodiment described above, anchor fittings 51 having a central opening are engaged with the outer periphery of the tension member 16, the outer peripheral surface of the rear end of the fittings 51 is contacted with the stepped portion 21C of the housing member 21, the central portion of the front end of the fittings 51 is contacted with stationary fittings 52 calked to the outer periphery of the member 16, and the fittings 51, and the member 16 are relatively secured within the housing member 21.

On the other hand, optical fiber core wires 14 are led from the through openings perforated at the plate of the fittings 51 to the end side of the housing member 21, and the core wires 14 are optically connected through the connecting means described above.

Then, a fourth embodiment of the invention shown in FIG. 9 will now be described.

Figure 9:
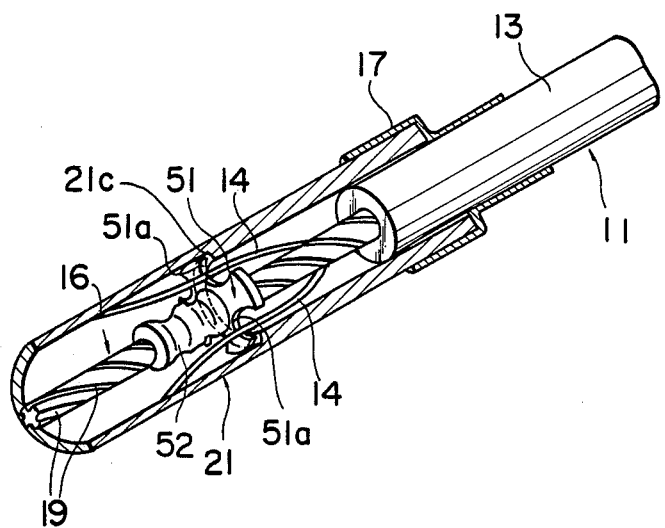
FIG. 9 is a perspective fragmentary view of the interior structure of an outside housing member in a fourth embodiment of a connecting section for optical fiber cables according to this invention.

In the optical fiber cable 11 shown in FIG. 9, a plurality of spiral slots 19 are formed on the outer peripheray of a tension member 16 disposed at the axial center of the cable, and optical fiber core wires 14 are engaged within the slot 19.

The optical fiber core wires 14 are held in the slot 19 by the retaining winding layer wound on the outer periphery of the member 16.

In the embodiment in FIG. 9, the optical fiber core wires 14 and the member 16 are led from the end of the cable sheath 13, and an outside housing member 21 having a stepped portion 21c is mounted on the inner periphery of the base end side on the outer periphery of the end of the sheath similar to the above embodiments.

In this embodiment, ring-shaped anchoring fittings 51 having a plurality of notches 51a are engaged with the outer periphery of the member 16, the outer periphery of the rear end of the fittings 15 is contacted with the stepped portion 21c of the housing member 21, the central portion of the front end of the fittings 51 is contacted with a stationary ring 52 calked to the outer periphery of the member 16, and the fittings 51, and the member 16 are relatively secured within the housing member 21.

The optical fiber core wires 14 are led from the notch 51a of the fittings 51 to the end side of the housing member 21, and optically connected through the connecting means described above.

Then, a fifth embodiment of the invention shown in FIG. 10 will be described.

Figure 10:
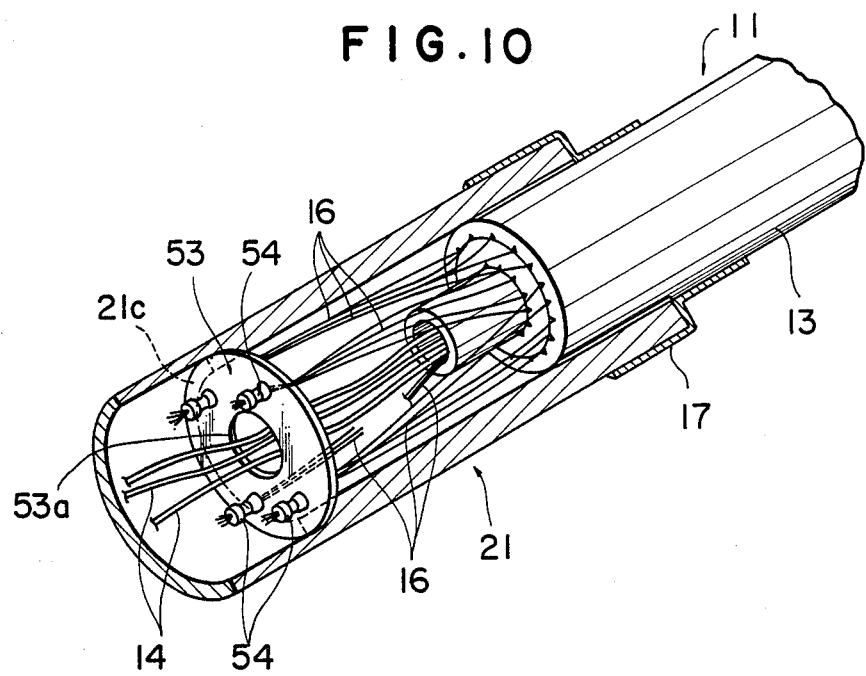
FIG. 10 is a perspective fragmentary view of the interior structure of an outside housing member in a fifth embodiment of a connecting section for optical fiber cables according to the invention.
Figure 11:
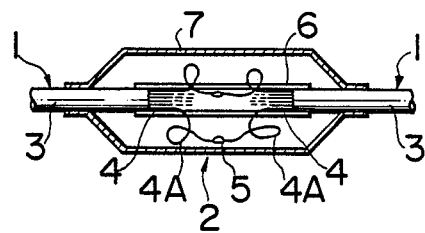
FIG. 11 is a sectional view showing a conventional connecting section of optical fiber cables.

In the embodiment in FIG. 10, the optical fiber cable 11 is of a gas-filled or jelly-filled type, a number of fine linear tension members 16 are interposed between the coating layers of the cable, the members 16 are led from the end of cable sheath 13 together with optical fiber core wires 14, and an outside housing member 21 having the stepped portion 21c is mounted on the outer periphery of the end of the sheath 13.

In the embodiment in FIG. 10, the ends of the members 16 bundled at every plural number are penetrated through the plate of ring-shaped anchoring fittings 53 contacted with the stepped portion 21c of the housing member 21, and a stationary ring 54 is calked to the ends of the tension members of penetrated state.

In this case, the tension members 16 of tensile state are strongly contacted with the stepped portion 21c at the fittings 53 while towing the fittings 53 through the ring 54. Thus, the fittings 53 and the members 16 are relatively secured in the housing member 21.

The optical fiber core wires 14 in FIG. 10 are also led from the central opening 53a of the fittings 53 to the end side of the housing member 21, and the core wires 14 are optically connected through the connecting means described above.

In the gas-filled or jelly-filled type optical fiber cable 11 in FIG. 10, the core wires 14 and the tension members 16 are lead from the end of the sheath by sealing the end of the sheath by known means.

According to the connecting section of the optical fiber cables in accordance with this invention as described above, the optical fibers are simultaneously connected through the multicore connectors, and the cable sheaths are coupled through the housings, the adapters and the fittings mounted at the ends of the sheaths. Consequently, the optical fiber cable connecting work including the cable elements can be simply and rapidly performed without any difficulty in a site. Further, since the cable connecting state of reproducibility can be provided, it is not necessary to provide excessive extensions at the optical fiber core wires, and the connecting section of the optical fiber cable can be reduced in diameter. Since the connecting parts such as the multicore connectors and the housings can be mounted in advance at a predetermined cable element in a factory, the optical fiber cable having the connecting parts can be manufactured in a mass production, and the share of the connecting work in the site can be alleviated, and the connecting section of the optical fiber cables can be rationally provided.

What is claimed is:

1. An apparatus for connecting optical fiber cables, said apparatus comprising:
   first and second multicore connectors respectively mounted on a plurality of optical fiber core wires extending from an end of a cable sheath of a first optical fiber cable and on a plurality of optical fiber core wires extending from an end of a cable sheath of a second optical fiber cable;
   first and second outside housing members mounted on the outer peripheral surface of the ends of the cable sheaths of said first and second optical fiber cables, respectively, each of said first and second outside housing members respectively securing a central tension member extending from the ends of the cable sheaths of said first and second optical fiber cables, said first and second outside housing members including means for directly coupling said first and second outside housing members;
   first and second inside housing members movable in a longitudinal direction within the interior of said first and second outside housing members, respectively, said multicore connectors being retained by said first and second inside housing members; and
   springs interposed between said first inside and outside housing members and between said second inside and outside housing members to apply a mating force to said first and second multicore connectors.

2. The apparatus set forth in claim 1, wherein said first and second multicore connectors and said first and second inside housing members are integrally formed, respectively.

3. The apparatus set forth in claim 1, wherein a centering guide pin and a guide opening are respectively provided within said first and second inside housing members.

4. The apparatus set forth in claim 1, wherein a fixing resin is provided within said first and second outside housing members to secure said central tension members.

5. The apparatus set forth in claim 1, wherein a stepped portion is provided within said first and second outside housings members that retains an anchor member that is secured to said central tension members.

6. An apparatus for connecting optical fiber cables, said apparatus comprising:
   first and second multicore connectors respectively mounted on a plurality of optical fiber core wires extending from an end of a cable sheath of a first optical fiber cable and on a plurality of optical fiber core wires extending from an end of a cable sheath of a second optical fiber cable;
   first and second outside housing members mounted on the outer peripheral surface of the ends of the cable sheaths of said first and second optical fiber cables, respectively, each of said first and second outside housing members securing a central tension member extending from the ends of the cable sheaths of said first and second optical fiber cables, said first and second outside housing members including means for directly coupling said first and second outside housing members;
   first and second extension housing members coupled to said first and second outside housing members, respectively;
   first and second inside housing members in which said first and second multicore connectors are respectively retained, said first and second inside housing members being coupled to said first and second extension housing member; and
   a spring located between said first inside housing member and said first multicore connector, said spring providing a mating force to said first and second multicore connectors.

7. The apparatus set forth in claim 6, wherein a centering guide pin and a guide opening are respectively provided within said first and second inside housing members.

8. The apparatus set forth in claim 6, wherein a fixing resin is provided within said first and second outside housing members to secure said central tension members.

9. The apparatus set forth in claim 6, wherein a stepped portion is provided within said first and second outside housing member that retains an anchor member that is secured to said central tension members.

10. An apparatus for connecting optical fiber cables, said apparatus comprising:
    first and second multicore connectors respectively mounted on a plurality of optical fiber core wires extending from an end of a cable sheath of a first optical fiber cable and on a plurality of optical fiber core wires extending from an end of a cable sheath of a second optical fiber cable;
    first and second outside housing members mounted on the outer peripheral surface of the ends of the cable sheaths of said first and second optical fiber cables, respectively, each of said first and second outside housing members including a stepped portion for retaining a ring anchor member, said ring anchor member including a plurality of anchor fittings, each of which anchors a plurality of tension members extending from the ends of the cable sheaths of said first and second optical fiber cables;
    first and second inside housing members movable in a longitudinal direction within the interior of said first and second outside housing members, respectively, said multicore connectors being retained by said first and second inside housing members; and
    springs interposed between said first inside and outside housing members and between said second inside and outside housing members to apply a mating force to said multicore connectors.

11. The apparatus set forth in claim 10, wherein said first and second multicore connectors and said first and second inside housing members are integrally formed, respectively.

12. The apparatus set forth in claim 10, wherein a centering guide pin and a guide opening are respectively provided within said first and second inside housing members.

13. An apparatus for connecting optical fiber cables, said apparatus comprising:
   first and second multicore connectors respectively mounted on a plurality of optical fiber core wires extending from an end of a cable sheath of a first optical fiber cable and on a plurality of optical fiber core wires extending from an end of a cable sheath of a second optical fiber cable;
   first and second outside housing members mounted on the outer peripheral surface of the ends of the cable sheaths of said first and second optical fiber cables, respectively, each of said first and second outside housing members including a stepped portion for retaining a ring anchor member, said ring anchor member including a plurality of anchor fittings, each of which anchors a plurality of tension members extending from the ends of the cable sheaths of said first and second optical fiber cables;
   first and second extension housing members coupled to said first and second outside housing members, respectively;
   first and second inside housing members in which said first and second multicore connectors are respectively retained, said first and second inside housing members being coupled to said first and second extension housing members; and
   a spring located between said first inside housing member and said first multicore connector, said spring providing a mating force to said first and second multicore connectors.

14. The apparatus set forth in claim 13, wherein a centering guide pin and a guide opening are respectively provided within said first and second inside housing members.

* * * * *